H. A. MARTIN.
TICKET PRINTING REGISTER.
APPLICATION FILED JAN. 29, 1913.

1,254,825.

Patented Jan. 29, 1918.
6 SHEETS—SHEET 5.

Witnesses
Carl N. Bogan
J. B. Ricketts

Inventor
Haa Kon A. Martin
by R. C. Glass
Chester H. Braselton
Attorneys

UNITED STATES PATENT OFFICE.

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

TICKET-PRINTING REGISTER.

1,254,825.  Specification of Letters Patent.  Patented Jan. 29, 1918.

Application filed January 29, 1913. Serial No. 744,920.

*To all whom it may concern:*

Be it known that I, HAAKON A. MARTIN, a citizen of the United States, residing at Dayton, in the county of Montgomery and State of Ohio, have invented certain new and useful Improvements in Ticket-Printing Registers, of which I declare the following to be a full, clear, and exact description.

This invention relates to improvements in cash registers or other forms of accounting machines and more particularly to the printing mechanism thereof, and has more specific relation to machines for handling the sale of railway tickets in a railway ticket office.

In the drawings and description given below the device covered by this application is shown as embodied in a multiple totalizer register of the type described in Letters Patent of the United States to Thomas Carroll No. 703,639, granted July 1, 1902, and Thomas Carroll No. 754,049 granted Mar. 8, 1904. This is because a register of this type would, in connection with the present improvement, give the most complete system for taking care of ticket sales in a railway ticket office where several clerks are on duty at the same time. However, this invention is one that can be applied in various forms to other types of cash registers and accounting machines and it is not the intention to limit its use to any one particular type.

One of the objects of this invention is to provide in a machine that prints on a ticket the price for which the ticket was sold, a device to print from an insertible type carrier the name of the station to which the ticket is sold and the serial numbers of the tickets sold to that particular station.

Another object of the invention is to provide means whereby there will be made as the transactions occur a mechanical record of the total number of sales to date of tickets to the particular destination represented by each of these cylinders or type carriers.

Another object of the invention is to provide mechanism whereby the register will be inoperable until there is inserted in the printer one of the cylinders used to print the name of the station and the serial numbers of the tickets sold to that station.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:

Fig. 3$^a$ is a cross section of a machine of the type to which the present improvements are shown as applied.

Fig. 3$^b$ is a detail view of the printing type wheels.

Described in general terms, the improvement consists of an addition to a cash register or accounting machine so that, besides the usual matter printed on tickets issued by the machine, there will be printed on the ticket the name of a railway station and the consecutive number of the ticket. The name of the station and the consecutive number are both printed from a cylinder or some other form of type carrier that must be inserted before the register will operate.

There are ticket printing devices on the market, but none of them accomplish the results obtained from a cash register such as described when the present improvement is embodied in it. None, so far as known, print the price of the ticket on the face of same or add the price on totalizers, and the printing is done from wheels which are in and a part of the printer and from detachable members on which the names of the stations are engraved. It is obvious that if the station names were engraved on the wheels no matter how large the wheels may be, there is a limited space for the names of stations and the capacity of the device is limited to just that extent.

The improved device is embodied in an accounting machine now on the market that records and totalizes sales registered, and the numbering device in the station cylinder or type carrier is, in a way, an accounting machine in that it makes a record of the number of tickets sold to its particular station. The price is printed on the face of the ticket, insuring proper entry in the accounting machine and preventing overcharges for tickets. Owing to the fact that the name of the station is printed from a separate type carrier, there is no limit to the number of stations that can be taken care of by one machine. All that is necessary is to have a cylinder or corresponding device for each station to which transportation is likely to be sold. The manner of operating the register is not changed, except that a station cylinder must first be inserted, and an account is kept mechanically of the ticket sales and cash received from that source. In checking up an office the auditor will base his audit on the figures shown by the various station cylinders, the amounts shown on the different totalizers of the cash register, and the continuous record strips printed by the register in the usual manner. On these strips is printed, as the transactions occur, the initial or designating character of the ticket seller and the amount of each sale. With previous systems the auditor based his work on the unsold tickets and the written records of the office.

The type of the machine to which the present improvements are shown as applied is well known in the art, and is fully described and illustrated in the hereinbefore mentioned Letters Patent. It will, therefore, be unnecessary to describe the same in detail herein, but for the purpose of illustration a brief description of the principal mechanisms of a machine of that type will be given.

Figure 3:
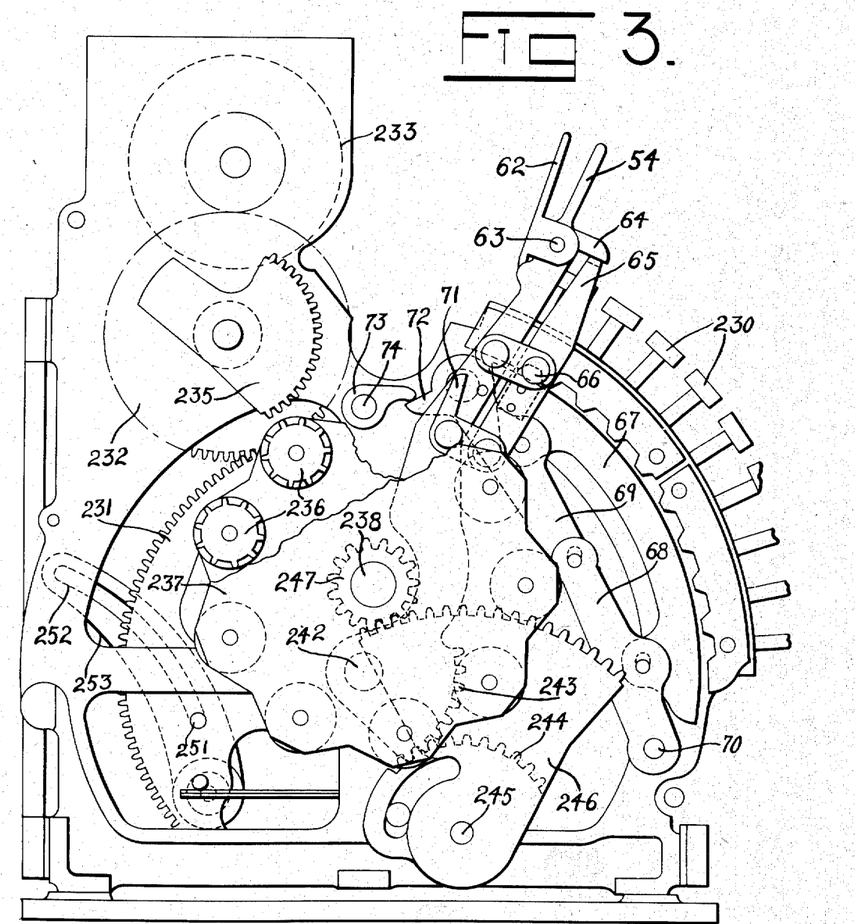
Fig. 3 is an end view of a machine of the type to which the present improvements are shown as applied as illustrated in the hereinbefore mentioned Letters Patent.
Figure 3A:
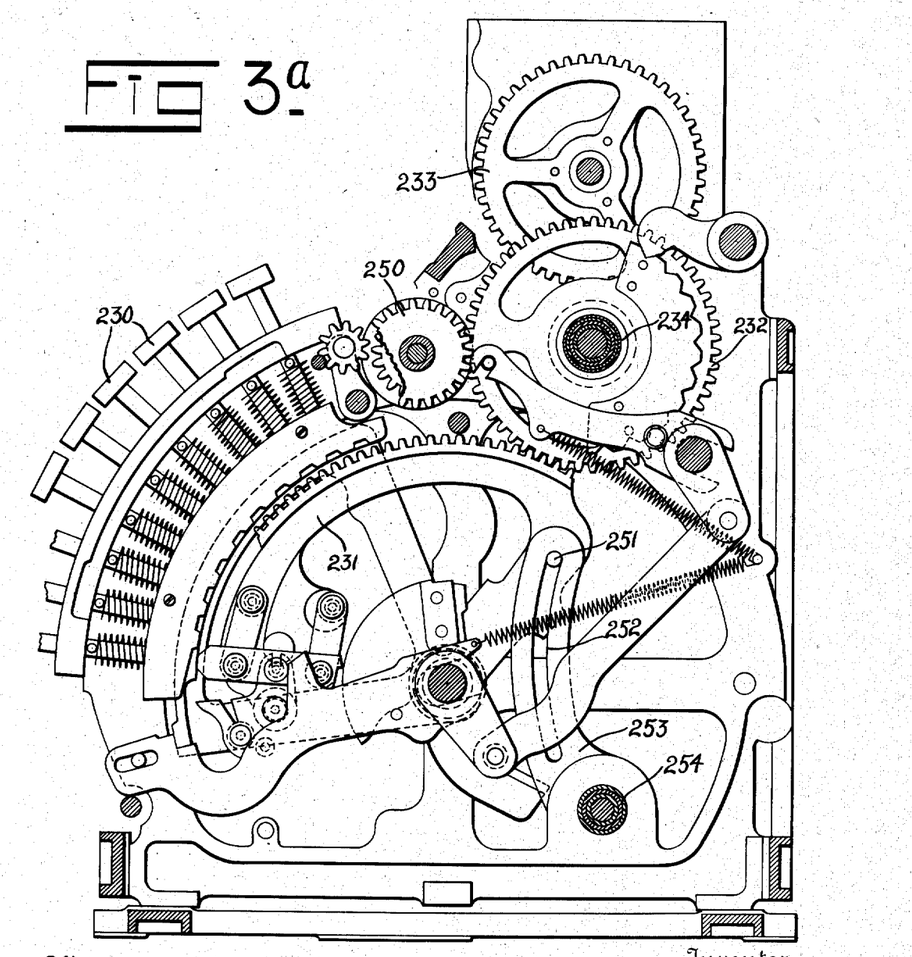
Figure 3B:
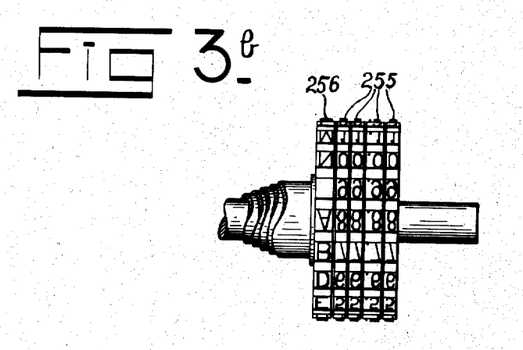

A machine of the type illustrated generally comprises a plurality of keys 230, which act differentially to control the adjustment of an operating member 231. The keys 230 are arranged in banks, and the number of banks provided is dependent upon the registering capacity desired of the machine. It is of course understood that there is an operating member 231 for each bank of keys 230, and the members 231 act differentially to adjust the intermediate gears 232, and through the medium of the said gears actuate the indicating mechanism 233 and the totalizer mechanism 250 in the manner set forth in the hereinbefore mentioned Letters Patent. In said patents, and as shown in Fig. 3ª, the gears 232 are fast on the inner ends of a series of nested sleeves 234 which extend to the left hand end of the machine and carry on their outer ends a series of actuating rack segments 235 (Fig. 3) adapted to actuate any desired one of a plurality of totalizers 236, carried by a rotatable frame 237 pivoted on a short shaft 238, mounted in a sliding frame not shown herein, but fully shown and described in said Letters Patent. The frame is mounted to slide in guideways so as to carry the positioned totalizer 236 into operative engagement with the actuating racks 235. The means for placing any one of the desired totalizers 236 in coöperative relation with the actuating racks 235 comprises a setting lever 54 pivoted at 242, and formed at its lower extremity with a rack segment 243. The rack segment 243 is constantly in mesh with a segment 244 fast on a shaft 245. On the shaft 245 is also rigidly mounted a segment 246 meshing with a pinion 247 fast to the carrier 237. The lever 54 is capable of adjustment in any one of nine different positions as shown in Fig. 3, and through the connections just described, will tend to rotate the carrier 237 to bring any desired one of the totalizers into coöperative relation with the actuating racks, and also to adjust a printing type wheel 256 located at the right hand end of the machine (Figs. 2 and 3ᵇ).

Each of the operating members 231 carries a pin 251 (see Figs. 3 and 3ª) which pins 251 project into cam slots 252 formed in arms 253 each of which is fast on the inner end of one of a series of nested sleeves 254 which project to the right, and through suitable operating connections serve differentially to adjust a series of type wheels 255 to a position appropriate to the adjustment of the operating members 231 under the control of the keys 230.

The operating mechanism for giving the operating movement to the members 231 is fully illustrated in Fig. 3ª, but as it forms no part of the present invention, and is fully described and illustrated in the hereinbefore mentioned Letters Patent, no description of the same will be given herein, as machines of this type are old and well known in the art.

Figure 1:
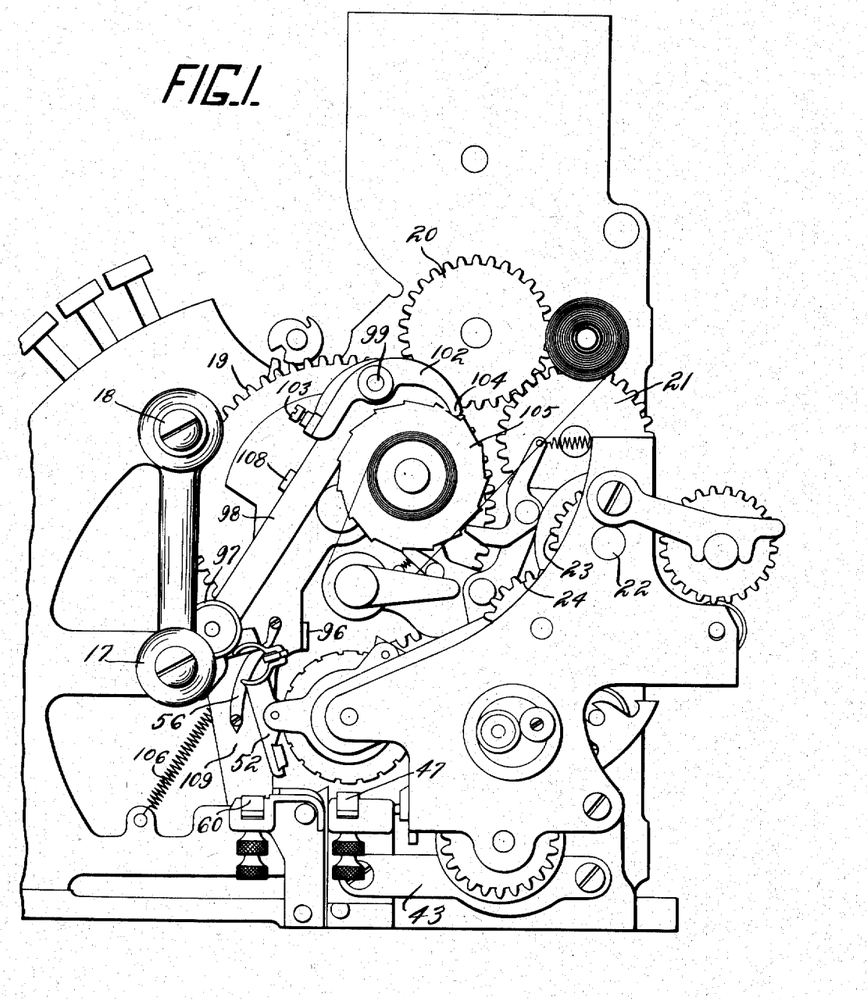
Figure 1 shows a side elevation of the printer of the type shown in the hereinbefore mentioned Letters Patent, with the present improvements applied thereto.
Figure 2:
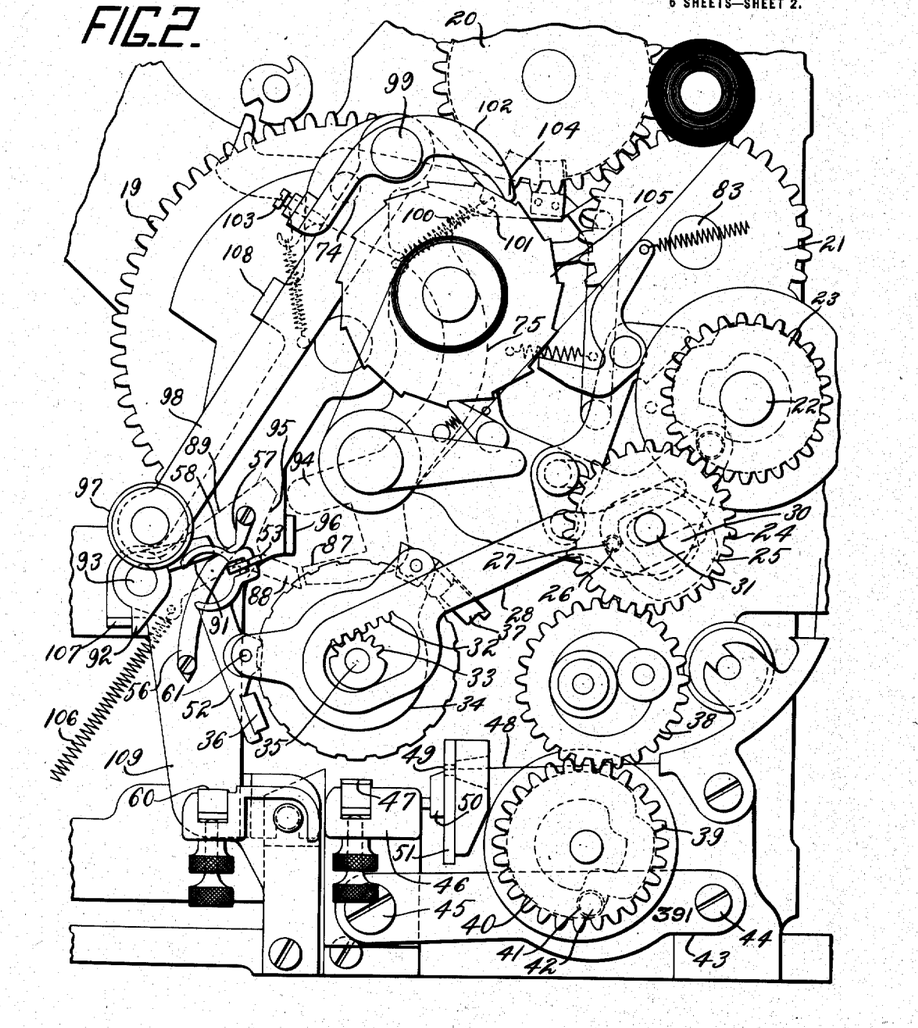
Fig. 2 shows a detail view of the same printer with the side plate removed and the improvement embodied.

Describing the parts of the device and with reference to the drawings, in Fig. 1 is shown an operating handle turning on stub shaft 18. Attached to the operating handle and turning on the same stub shaft is a gear (not shown) which meshes with a gear 19 and through the gear 19 drives gears 20 and 21 (Figs. 1 and 2). Gear 21 meshes into a gear (not shown) fastened to the inner end of a shaft 22 (Fig. 2). As shaft 22 is revolved, it carries with it gear 23 and drives a gear 24. In the side of gear 24 is a cam race 25 in which projects an anti-friction roll 26 mounted on a stud 27 in a pitman 28. As gear 24 revolves the cam race 25 acting through roll 26 and stud 27 gives the pitman 28 a reciprocating movement, the rear end of the pitman being guided by prongs 30 on the pitman which straddle a stub shaft 31. The reciprocating movement of pitman 28 is transmitted through a rack 32 formed thereon and a pinion 33 to an ink pad arm 34, rocking the ink pad arm on a type wheel shaft 35. This brings an ink pad 36 under the lower printing type and an ink pad 37 over the upper type in correct positions to ink the type. The inking of and printing from the lower type, with which the invention is mainly concerned, is accomplished in the following manner:—Gear 24 as it revolves drives gears 38 and 39, (Fig. 2). Gear 39 is fast to a feeding roller not shown herein but shown and described in the hereinbefore mentioned Letters Patent. Fast on the inner end of said roller (Fig. 2) is a box cam 391 which has a cam race 40 on the inner side in which race operates an anti-friction roll 41 mounted on to a stud 42 in a lever 43, which lever is swung loose on a screw 44, carried by the frame of the machine. As the gear 39 revolves, the cam race 40 acting against the roll and stud mentioned, pulls the left end of said lever 43 up and through a screw 45 raises a sliding platen carrier 46. This action of the parts causes a rubber impression block 47 to press the ink pad 36 (which is at that moment interposed between said pad and the type wheels) up against the lower type and ink them. After the type are inked the further operation of the register draws the ink pad out of the way and the impression block 47 again comes up and presses the ticket paper 48 which is fed through a slot 49 in a stationary knife 51 up against the type and makes an impression on the paper of the matter set up by the type. At the same time a knife 50 which is attached to the platen carrier 46 passes across the face of slot 49 in knife 51 and severs the slip that has just been printed from the strip of paper that is being fed through the printer. The ticket can then be removed.

As thus far described the mechanism and the operation of same are the ones usual in a register of this type and need not be gone into in greater detail. They have been described to this extent because the improvement is operated principally from this mechanism as is explained in the next following.

Figure 5:
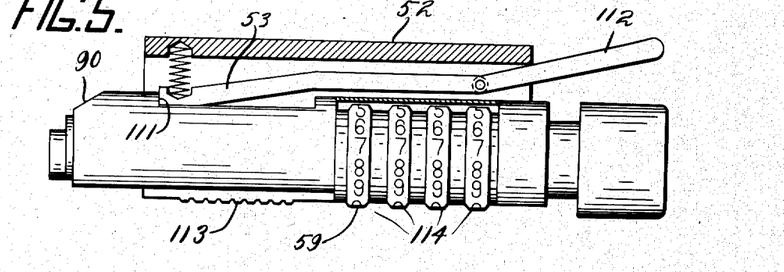
Fig. 5 shows an enlarged view of one of the station cylinders with part of the outer shell broken away to expose the numbering wheels, a sectional view of the carrier into which the cylinder is inserted, and the catch which holds the cylinder in correct position after it is inserted in the carrier.

The carrier 52 (Fig. 2) for the station cylinder shown in Fig. 5, is an extension of the usual carrier for the lower ink pad in a register of this type. Fig. 5 shows the carrier 52 partly in section and the catch 53 for holding a cylinder in position after it is inserted in the carrier. An inner oscillating core 119 in the cylinder (Fig. 6) has a slot partly shown at 55 that, as the cylinder is inserted in the carrier, spans a consecutive number operating plate 56 attached to a mounting plate 109. When the register first starts the carrier 52 is raised upward and cam edges 57 and 58 on the operating plate 56 oscillate member 119 and cause the consecutive numbering device to add "one" in a manner which will be hereinafter described. As the register continues the operation, this cylinder carrier and cylinder are brought down until the printing line 59 (Fig. 5) is just above an impression block 60 and ink pad 36 is resting above impression block 47. As the operation of the register is continued and impression block 47 is pressed up against the ink pad holder to ink the type, the upward movement of block 47, using shaft 61 as a fulcrum, forces the cylinder carrier 51 down and presses the printing type of the inserted station cylinder against the face of the ticket that is being printed, thereby printing on the ticket the name of the railway station and the serial number of the ticket. Completing the operation of the register prints the amount or price on the ticket and cuts it off as above described.

From what has already been said, it will be seen that it is essential that the register be inoperable until a cylinder representing the station to which a ticket is being sold, is inserted in the cylinder carrier. Otherwise a ticket seller could operate the register and enter the sale without printing the proper ticket, causing confusion in the accounting because the amount would be added on the totalizers. The previous construction had no such provision, but the improvement includes mechanism to give the desired result.

Figure 4:
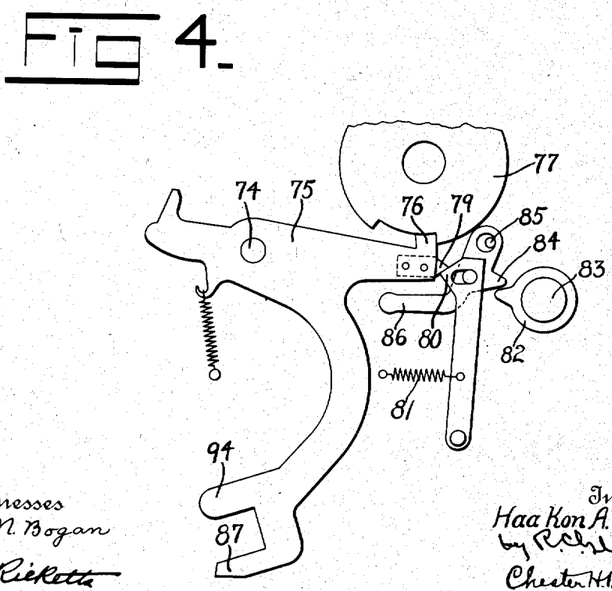
Fig. 4 shows a part of the mechanism which makes it impossible to release the register for operation until one of the station cylinders is inserted in the printer.

This locking device consists of levers coacting in such a way that they prevent the operation of the register until one of the station cylinders is inserted. They are operated principally by the usual parts in such registers. In Fig. 3 is shown a detail of the usual parts, one function of which is to trip the mechanism that normally prevents the register from being operated. When pinch lever 62 is pressed toward the bar 54 on which it is mounted, pivot 63 acts as a fulcrum and an extension 64 formed on lever 62 is forced down against the end of a plunger 65. This plunger has a block 66 riveted to the inner side and resting on the upper edge of a curved plate 67. As this plate is forced down the movement is transmitted to arms 68 and 69 swung at points 70 and 71 respectively. Arm 69 has an extension 72 which rests under the end of a short lever 73 on a shaft 74, and as arm 69 is forced down it acts with shaft 71 as a fulcrum and raises lever 73, rocking shaft 74 in an anti-clockwise direction. On the opposite end of shaft 74 (Fig. 2) is a locking lever 75 which is the usual lever with an extension to make it one of the operating parts of the improvement. This lock lever 75 is shown in detail in Fig. 4 and applied in Fig. 2. As the shaft 74 is rocked by the operation of the parts shown in Fig. 3, lever 75 (Fig. 4) is oscillated so that the extension 76 clears the cut in cam 77 on one of the main operating shafts of the machine and the machine is free to operate. As this lever is carried down by the oscillating of the shaft 74 the point 79 passes under point 80 (Fig. 4) and, because of the tension of a spring 81, latches the lever 75 down and helps to retain it in position until its work has been completed. This latch is released so that the lever 75 can return to its normal position by a cam 82 which is attached to a shaft 83 (Figs. 2 and 4). As this shaft 83 is revolved in the operation of the register, cam 82 strikes an extension 84 on a pawl swinging loose on a stud 85 and forces an arm 86 up against the under side of lever 75. This carries the point 79 back up over point 80 and, through the tension of spring 81, the lever 75 is retained in its normal position as shown in Fig. 4.

The lower extension of the lever 75 (Figs. 2 and 4) rests normally opposite an extension 88 on an arm 89 (Fig. 2). It will be seen at once that lever 75 being fastened rigidly to shaft 74, that shaft cannot be rocked to unlock the mechanism until extension 88 is drawn out of the way of extension 87. This is accomplished in the following manner:

A stop pawl 92, a pawl 91, and the locking lever 89 are all attached to a shaft 93 and are held in normal position as shown in Fig. 2 by a spring 106 holding the stop pawl 92 against a lug 107 on the mounting plate 109. As one of the station cylinders is inserted in the cylinder carrier the beveled surface 90 (Fig. 5) passes under pawl 91 (Fig. 2) and, acting through shaft 93, carries extension 88 up far enough to clear extension 87. Pinch lever 62 (Fig. 3) can then be operated and the releasing shaft 74 will oscillate. An extension 94 on lever 75, as the shaft 74 oscillates, will strike at about point 95 on the opposite extension of cam locking lever 89 and move it up still farther so that pawl 91 will clear the end of the station cylinder on the return stroke of the cylinder after it has passed over the consecutive number operating portions 57 and 58 of plate 56 as described in the foregoing.

While the mechanism just described is simple and partly an addition to the present mechanism, it effectively gives the desired result, that is, makes it impossible to operate the register until one of the station cylinders is in position.

To ink the type of the station cylinder, suitable mechanism is added to the regular printing mechanism. The inking is done when the cylinder carrier is at the top of the up stroke and resting against the stop 96 on mounting plate 109 (Fig. 1). The inking roller 97 is attached to an arm 98 swinging from a pivot 99. This arm and roll are normally held out away from the cylinder and against a stop 108 on mounting plate 109 by a spring 100 which has one end attached to a tension arm 101 on the inking arm 98 and the other end to mounting plate 109. To move the inking roller a pawl 102 is provided having an adjusting screw 103 engaging the ink roller carrying arm 98. The rear end of pawl 102 engages the usual feeding ratchet 105 for the record strip as indicated. As the ratchet is revolved by the operating mechanism to wind the record strip, the end of pawl 104 is cammed up by the teeth of the ratchet and as the pawl is swung loose on shaft 99, adjusting screw 103 in the other end of the pawl is forced against the ink roll arm 98 and ink roll 97 is carried in against the printing type of the station cylinder. As pawl 104 trips over the point of the tooth, spring 100 pulls the roll away from the type and into normal position as shown in Fig. 2. The cylinder is then carried down and prints in the manner hereinbefore described.

In order to hold the station cylinders in proper operating position there is provided a latch 53 (Figs. 5 and 2). As the cylinder is pushed into the carrier, its beveled surface 90 strikes latch 53 and cams it up and, when the cylinder is entirely in, the latch drops back of a shoulder 111 (Fig. 6) on the cylinder, and holds the cylinder in correct operating position. To remove the cylinder after each operation it is necessary to press down on handle 112 and draw the cylinder out of the carrier. Each of the cylinders carries a line of type such as an electro 113 (Fig. 5) to print the name of the station to which a ticket is sold, and consecutive numbering wheels 114 to print the serial numbers of tickets sold to that particular station.

It is, of course, necessary to have the station cylinders so constructed that they are locked against accidental operation in handling. Otherwise the numbers shown by the devices could not be relied upon as showing correctly the number of transactions in which they had been used. In the following description the manner of unlocking the operating parts is described and this will give a correct understanding of this part of the device.

When a station cylinder is inserted in the carrier as shown in Fig. 5, a plunger 115 therein (Figs. 6 and 9) strikes consecutive numbering device operating plate 56 (Fig. 9) and is pushed in so that a pin 116, which is fastened in plunger 115, is carried clear of a recess 117 (Fig. 10) in the outer sleeve 131 of the cylinder. The pin is carried forward in the elongated slot 118 (Fig. 11) of the inner rotating core 119 (Fig. 6) and this member is free to operate the consecutive numbering device while the outer sleeve 131 is held rigid by catch 53 (Fig. 5).

Figures 6, 7, 8, 9, 10, 11, 12:
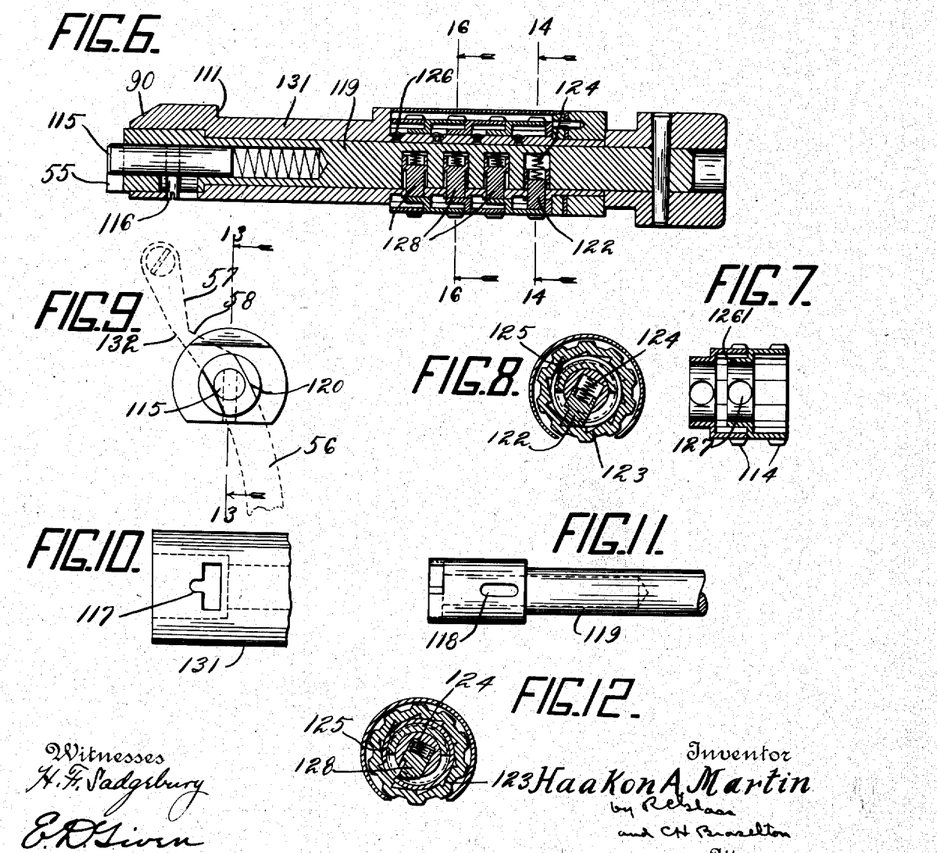
Fig. 6 shows an enlarged longitudinal section of one of the cylinders on line indicated as 13—13 in Fig. 9.
Fig. 7 shows a sectional view of the units and tens wheels of the consecutive numbering device.
Fig. 8 shows a cross section of the cylinder at the point indicated as 14—14 in Fig. 6.
Fig. 9 shows the left end of the cylinder, the plunger, the operating slot and the consecutive numbering device operating plate.
Fig. 10 shows the under side of the left end of the cylinder.
Fig. 11 shows the left end of the inner rotating member of the cylinder.
Fig. 12 shows a cross section through the cylinder at point 16—16 as shown in Fig. 6.

The consecutive numbering device is operated by pawls 122 and 128 carried by core 119. This core is rocked first in one direction and then the other on account of slot 55 across its end working in connection with the eccentric slide 56 (Fig. 2). The relation of the slide to the slot when in engagement is shown in Fig. 9. As the cylinder is carried slightly upward from normal position, the upper edge 120 of the slot is guided against edge 57 of the cut in the operating slide 56 by the other edge 132 of the slide. This rocks the inner operating member or core 119 in a clockwise direction (Fig. 9) and then, as the cylinder is carried downward, the lower edge 121 of the slot is guided against edge 58 of the operating plate 56 and core 119 is rocked in a counter clockwise direction (Fig. 9). The counterclockwise movement of the core 119 is just sufficient to carry pawl 122 (Figs. 6 and 8) back to the position where it can engage the next tooth of an internal ratchet 123 in the units numbering wheel. On the clockwise oscillation of the core 119 the adding wheel is carried forward one division and adds "one" on the device. The pawls 122 and 128 are always being forced outwardly by compression springs 124 (Figs. 6, 8, and 12). After the numbering wheels have been carried one division they are retained by retaining springs 125 (Figs. 8 and 12). The springs are attached at one end by screws 126 to the outer sleeve 131 and the loose ends engage in the ratchets 123 to hold the wheels in position when they have been carried forward.

The transfer from one numbering wheel to the next higher in value is accomplished by one of the transfer pawls 128 (Fig. 6) operating through a hole in the hub of one wheel and engaging the ratchet in the next wheel. The wheels of the consecutive numbering device go into engagement one with the other as shown in Fig. 7. Each adding wheel has a hub 1261 that is inserted in the internal ratchet in the wheel next adjoining it on the left. In each hub is a hole 127, through which the transfer pawls operate on a transfer.

As inner member 119 is rocked in an anti-clockwise manner as hereinbefore described, pawl 122, which is always in engagement with ratchet 123 in the units wheel, is carried back until it engages the next notch of the ratchet. When inner member 119 is rocked clockwise on the upward travel of the cylinder carrier, the units wheel is carried forward one division and retained by the retaining spring 125 (Fig. 8). On the tenth operation of the units wheel, pawl 128 (Fig. 6) in operating core 119 is pushed by its spring through hole 127 in the hub of the units wheel. Then as the units wheel is carried forward the tens wheel is also carried one division and retained in that position. On the next operation, transfer pawl 128 is withdrawn from hole 127 as the operating shaft 119 is rocked anti-clockwise and on the clockwise oscillation the units wheel is carried forward one division and retained in that position so that the hub of the units wheel is again in the path of transfer pawl 128, and the tens wheel will not again be carried forward until hole 127 is again brought into alinement with pawl 128 by the operation of the units wheel nine more times. The transfer from each numbering wheel to the wheel of next higher value is made in the same manner as just described.

This completes the mechanical description of the improvement. It shows that, while the device is shown as an addition to a cash register or accounting machine, and the construction is simple, it gives admirably the results for which it is designed.

As to the use of the system, in a railway ticket office as now usually conducted there are racks with separate compartments each compartment containing the tickets to a certain station. When an intending passenger calls for a ticket, the ticket seller selects the proper ticket from the rack and stamps it or otherwise marks it to show date of sale, dates between which it can be used, or any other information that has to be entered thereon in accordance with the rules of his company. He then delivers the ticket to the purchaser and receives the money in payment. The ticket does not show the amount paid for it and no record is made at the time of the money taken in, but the money is simply placed in some receptacle provided for it. Where several ticket sellers are on duty at the same time there is no record made identifying the seller with the transactions and no way of telling what his individual transactions totaled for any particular period of time.

In a railway ticket office using a cash register of the type mentioned and containing this improvement, there will be racks with compartments each containing a cylinder or one of the other forms of type carriers to print the name of a station and the numbers of the tickets sold to that particular station, as they are issued by the register. When a ticket to a certain station is called for, the ticket seller will select the cylinder for that station and insert it in the printer of the register, then set the lever on the left side of the register opposite the letter or character that represents his transactions. This brings his individual totalizer in alinement with the actuating mechanism and releases the register through the operation of the parts in Figs. 3 and 4 so that the machine can be operated. When he operates the register the date, price of the ticket and initial of the ticket seller, the name of the station to which the ticket is sold and the serial number of the ticket will be printed on the face of the ticket. In addition to this the register will print on the front and back of the ticket any desired wording that can be brought within the limits of the usual electrotypes. The sale is also recorded on the usual sales strip and indicated in the ordinary way by the indicators at the top of the register. The amount collected for the ticket will be added on the ticket-seller's individual cash totalizer and on the main totalizer which adds into one total the sales of all of the ticket sellers.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination with a main operating mechanism, of means normally locking it against operation, a printing device comprising a cylinder normally detached from the machine but insertible therein and having devices for printing the name of a station and the serial numbers of tickets sold to that station, connections whereby the insertion of said cylinder into the machine releases the locking means and means for actuating said serial number device upon an operation of the machine.

2. In a machine of the class described, the combination with a main operating mechanism, of means normally locking it against operation, a printing device comprising a cylinder normally detached from the machine but insertible therein and having devices for printing the name of a station and the serial numbers of tickets sold to that station, said cylinder having means for unlocking said first mentioned means, means to receive said cylinder when inserted into the printer and carrying it to effect said printing and means for actuating said serial number device upon an operation of the machine.

3. In a machine of the class described, a ticket printing mechanism comprising a cylinder carrying detachable type for printing the name of a station, a set of consecutive number printing type wheels in the cylinder, an oscillatory core on which said wheels are mounted, means whereby oscillation of the core advances the wheels, an eccentric plate engaging the core and constructed to oscillate the core when the cylinder is moved relative to the eccentric plate, and means for moving the cylinder relative to the plate.

4. In a machine of the class described, the combination with a main operating mechanism, a railway ticket printer comprising a cylinder normally detached from the machine but insertible therein and having devices for printing the name of a station and the serial numbers of tickets sold to that station, means for inking the printing type of said cylinder, means for making an impression on a ticket from said type, and means for actuating said serial number device.

5. In a machine of the class described, the combination with a main operating mechanism, of means normally locking it against operation, a printing device comprising a cylinder normally detached from the machine but insertible therein and having devices for printing the name of a station and the serial numbers of tickets sold to that station, a carrier attached to one of the moving parts of the main operating mechanism to receive said cylinder when inserted and carry it to effect said printing and means for actuating said serial number device.

6. In a machine of the class described, the combination with a main operating mechanism, of means normally locking it against operation, a printing device comprising a cylinder normally detached from the machine but insertible therein, and having devices for printing the name of a station and the serial numbers of tickets sold to that station, with means for receiving the cylinder and carrying it through its various operations, suitable mechanism for inking the printing type of said cylinder and means for actuating said serial number device at each operation of the operating mechanism.

7. In a machine of the class described, the combination with a main operating mechanism, of price printing and operators' identifying type carriers, manipulative devices controlling said type carriers, a plurality of station devices separately insertible into the printer, said devices carrying type to print the names of destination stations and type carriers for serially numbering the tickets sold to the stations, means in the machine for operating the consecutive numbering type carriers to advance same when the main operating mechanism is operated, and means actuated by the main operating mechanism for taking impressions from all of the above mentioned type carriers.

8. In a machine of the class described, the combination of a main operating device, a ticket printing mechanism comprising a detachable member having station printing type thereon and carrying a consecutive number or serial number printing device, locking means for said operating device rendered effective when said member is detached and means operated by said operating device for effecting an operation of said serial number device.

9. In a machine of the class described, the combination of a main operating device, a ticket printing mechanism adapted to receive a detachable member, said member comprising printing type thereon and carrying a consecutive number or serial number printing device, normally effective locking means for said operating device rendered ineffective by the insertion of said member in said printing mechanism and means operated by said operating device for effecting an operation of said serial number device.

10. In a machine of the class described, the combination with a main printing device, of an auxiliary printing device, inking means for the main printing device, and a single means for simultaneously operating said inking means and auxiliary device.

11. In a machine of the class described, the combination with a main printing device, of an auxiliary printing device, impression means for each of said devices and means for rendering the impression means of one of said devices effective by a movement of the other of said means.

12. In a machine of the class described, the combination with a main printing device, of an auxiliary printing device, impression means for each of said devices, and means for rendering one of said devices effective by a movement of the impression means of the other device.

13. In a machine of the class described, the combination with a main printing device, of an auxiliary printing device, impression means for each of said devices, and means for operating said auxiliary device by an operation of the impression means of the main printing device.

14. In a machine of the class described, the combination with a plurality of destination devices normally detached but separately insertible into the machine, each of said devices comprising type to print the name of a station and consecutive numbering type carriers for recording the serial numbers of tickets sold to that station; means for operating the consecutive numbering type carriers to advance same; manipulative devices, a set of price printing type carriers controlled by said manipulative devices; and means for taking impressions on tickets from all of the type carriers.

15. In a machine of the class described; a ticket printing mechanism comprising a series of destination devices normally detached but separately insertible into the machine, each of said destination devices carrying a consecutive numbering device for recording the numbers of tickets sold to that station and devices normally locking the consecutive numbering device against operation, and means in the machine for disabling said locking devices when the destination devices are inserted into the machine.

16. In a machine of the class described, the combination with a main operating mechanism, of means normally locking said mechanism against operation, a ticket printing mechanism comprising destination devices normally detached from the machine but separately insertible therein, each of said destination devices carrying type for printing the name of a station and a consecutive numbering device for recording the serial numbers of tickets sold to that station, means effective when the destination devices are detached for locking the consecutive numbering devices against operation, means whereby inserting a destination device into the machine will disable both the locking devices for the main operating mechanism and the locking means for the consecutive numbering device, and means in the machine for operating the consecutive numbering device and taking impressions from the station type.

In testimony whereof I affix my signature in the presence of two witnesses.

HAAKON A. MARTIN.

Witnesses:
R. C. GLASS,
F. E. HAMILTON.